(12) United States Patent
Gerbus et al.

(10) Patent No.: US 9,727,092 B1
(45) Date of Patent: Aug. 8, 2017

(54) TORQUE HINGE FOR A COMPUTING DEVICE

(71) Applicant: Intel Corporation, Santa Clara, CA (US)

(72) Inventors: Dan H. Gerbus, Aloha, OR (US); Ralph V. Miele, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/013,110

(22) Filed: Feb. 2, 2016

(51) Int. Cl.
*G06F 1/16* (2006.01)

(52) U.S. Cl.
CPC .......... *G06F 1/1681* (2013.01); *G06F 1/1632* (2013.01); *G06F 1/1654* (2013.01)

(58) Field of Classification Search
CPC ..... G06F 1/1632; G06F 1/1654; G06F 1/1681
See application file for complete search history.

(56) References Cited

U.S. PATENT DOCUMENTS

| | | | | |
|---|---|---|---|---|
| 5,619,397 A * | 4/1997 | Honda | ................... | G06F 1/1632 361/679.43 |
| 5,627,727 A * | 5/1997 | Aguilera | ............... | G06F 1/1626 361/679.43 |
| 6,937,468 B2 * | 8/2005 | Lin | ....................... | G06F 1/1632 361/679.41 |
| 8,599,542 B1 * | 12/2013 | Healey | .................. | G06F 1/1626 345/168 |
| 8,929,070 B2 * | 1/2015 | Liu | ..................... | H05K 7/20145 165/104.33 |
| 8,947,867 B2 * | 2/2015 | Hsu | ........................ | G06F 1/1624 361/679.21 |
| 8,995,121 B2 * | 3/2015 | Yen | ........................ | G06F 1/1632 361/679.2 |
| 9,001,508 B2 * | 4/2015 | Mori | .................... | H05K 5/0217 361/679.55 |
| 9,423,833 B2 * | 8/2016 | Sano | ........................ | G06F 1/166 |
| 9,483,076 B2 * | 11/2016 | Liang | .................... | G06F 1/1632 |
| 2002/0145846 A1 * | 10/2002 | Helot | ..................... | G06F 1/1683 361/679.27 |
| 2004/0001305 A1 * | 1/2004 | Chuang | ................. | G06F 1/1632 361/679.3 |
| 2004/0246666 A1 * | 12/2004 | Maskatia | .............. | G06F 1/1616 361/679.57 |
| 2005/0057893 A1 * | 3/2005 | Homer | .................. | G06F 1/1632 361/679.29 |
| 2006/0256516 A1 * | 11/2006 | Cho | ....................... | G06F 1/1616 361/679.29 |

(Continued)

*Primary Examiner* — Adrian S Wilson
(74) *Attorney, Agent, or Firm* — Patent Capital Group

(57) ABSTRACT

Embodiments of the present disclosure pertain to a computer dock that can engage a friction element upon receiving a computing device, such as a tablet. The computer dock includes a housing coupled to the computer dock, the housing comprising a cradle to receive a computing device, the housing coupled to the computer dock by a hinge pin and configured to rotate about the hinge pin about a first axis; a friction hinge rigidly affixed to the computer dock; a pivot arm affixed to the housing, the pivot arm configured to rotate about a pivot point. The pivot arm includes a first portion comprising a computing device engagement part to receive the computing device; and a second portion comprising a friction hinge engagement part to engage with the friction hinge upon receiving the computing device in the cradle.

25 Claims, 12 Drawing Sheets

(56) References Cited

U.S. PATENT DOCUMENTS

| | | | | |
|---|---|---|---|---|
| 2007/0014080 A1* | 1/2007 | McCormack | G06F 1/1632 | 361/679.41 |
| 2007/0289099 A1* | 12/2007 | Jung | G06F 1/1616 | 16/354 |
| 2008/0037767 A1* | 2/2008 | Gullickson | G06F 1/1632 | 379/428.02 |
| 2009/0141439 A1* | 6/2009 | Moser | G06F 1/1616 | 361/679.29 |
| 2010/0123663 A1* | 5/2010 | Leung | G06F 3/0231 | 345/169 |
| 2010/0238620 A1* | 9/2010 | Fish | G06F 1/1616 | 361/679.09 |
| 2010/0321882 A1* | 12/2010 | Tracy | G06F 1/1616 | 361/679.55 |
| 2011/0013350 A1* | 1/2011 | Tracy | G06F 1/1616 | 361/679.21 |
| 2011/0043991 A1* | 2/2011 | Yang | G06F 1/1681 | 361/679.27 |
| 2011/0149510 A1* | 6/2011 | Monsalve | F16M 11/10 | 361/679.55 |
| 2011/0255221 A1* | 10/2011 | Ling | G06F 1/1616 | 361/679.01 |
| 2012/0212900 A1* | 8/2012 | Hung | G06F 1/1632 | 361/679.41 |
| 2013/0039000 A1* | 2/2013 | Vicente, Jr. | G06F 1/1681 | 361/679.41 |
| 2013/0163187 A1* | 6/2013 | Wang | G06F 1/1632 | 361/679.41 |
| 2013/0170126 A1* | 7/2013 | Lee | G06F 1/1654 | 361/679.17 |
| 2013/0188304 A1* | 7/2013 | Lee | G06F 1/1667 | 361/679.12 |
| 2014/0133080 A1* | 5/2014 | Hwang | G06F 1/1632 | 361/679.17 |
| 2014/0193193 A1* | 7/2014 | Wikander | G06F 1/1616 | 403/322.1 |
| 2014/0285962 A1* | 9/2014 | Staats | G06F 1/1632 | 361/679.43 |
| 2014/0293534 A1* | 10/2014 | Siddiqui | E05D 7/00 | 361/679.55 |
| 2015/0055289 A1* | 2/2015 | Chang | G06F 1/1632 | 361/679.43 |
| 2015/0138721 A1* | 5/2015 | Liang | G06F 1/1632 | 361/679.44 |
| 2015/0185783 A1* | 7/2015 | Hui | G06F 1/1656 | 361/679.29 |
| 2015/0373440 A1* | 12/2015 | Fontana | H04R 1/025 | 381/388 |
| 2016/0026221 A1* | 1/2016 | Lee | G06F 1/1654 | 361/679.29 |
| 2016/0054761 A1* | 2/2016 | Wolff | E05D 7/10 | 361/679.09 |
| 2016/0239053 A1* | 8/2016 | Kiple | G06F 1/1626 | |
| 2016/0246333 A1* | 8/2016 | Mehandjiysky | G06F 1/1632 | |
| 2016/0369543 A1* | 12/2016 | Park | E05D 11/082 | |

* cited by examiner

TORQUE HINGE FOR A COMPUTING DEVICE

TECHNICAL FIELD

This disclosure pertains to a torque hinge for a computing device, and more particularly, to a selectable torque hinge for a detachable computing device.

BACKGROUND

Mobile computing can be achieved through dockable tablet computers and 2-in-1 laptops, which can have a tablet component detachable from a base or docking component (or just "dock," for brevity). The tablet or tablet component or monitor component (or, just "tablet" for brevity) can include an interface that facilitates mechanical and electrical connectivity to a docking component or docking station. The tablet can include processors, a display, a user interface, such as a touch screen, input/output ports, etc.

The dock can include further computing enhancements, such additional batteries, additional processors, additional input/output ports, etc. The dock can be a docking station or can be a base to a laptop, such as that which would include a keyboard and trackpad. The dock can also include an interface that allows a tablet or tablet component to attach to the dock mechanically and electrically.

DETAILED DESCRIPTION

Adjustable hinge positions in dockable tablet computers and 2-in-1 systems are desired and can use a friction element in the computer dock hinge to hold the tablet at a desired angle. When the tablet is removed, the hinge may need to move back to a zero position for storing the computer dock and for protecting the hinge assembly (and any corresponding exposed electrical and mechanical connections) from snagging and breaking. For some friction elements, adjustment of the docking angle can be difficult when the tablet is not docked due to the lack of the leverage achieved by the tablet. The tablet can serve as a lever arm that provides mechanical advantage to overcome a friction element in a hinge of the dock. When the tablet is disengaged from the dock, the hinge may be in a position that protrudes from the dock. This protrusion may be problematic when stowing the dock, and the user would need to collapse the hinge in order to get the dock to lie flat or fit the dock into a bag. The difficulty in moving the hinge arises from the friction needed to hold the tablet in position while docked. The required friction to hold the tablet in place is sufficiently large such that manipulating the hinge without tablet attached (and serving as a lever) and with the user's bare hand becomes difficult.

This disclosure describes a hinge that includes an engagement mechanism that disengages the friction element when the tablet is not attached to the base. The friction element can be disengaged when the tablet is removed and engaged while the tablet is attached to the base.

Magnets or other mechanical latches can be used in response to the presence of a tablet to actuate a toothed lever arm or linking arm, which engages a cog or gear attached to a friction element of a friction hinge. Once actuated, the toothed lever couples the friction element to the moveable hinge. When the tablet is detached, the toothed lever releases the friction element freeing the hinge to return to its zero position via a spring or similar device.

Figure 1A:
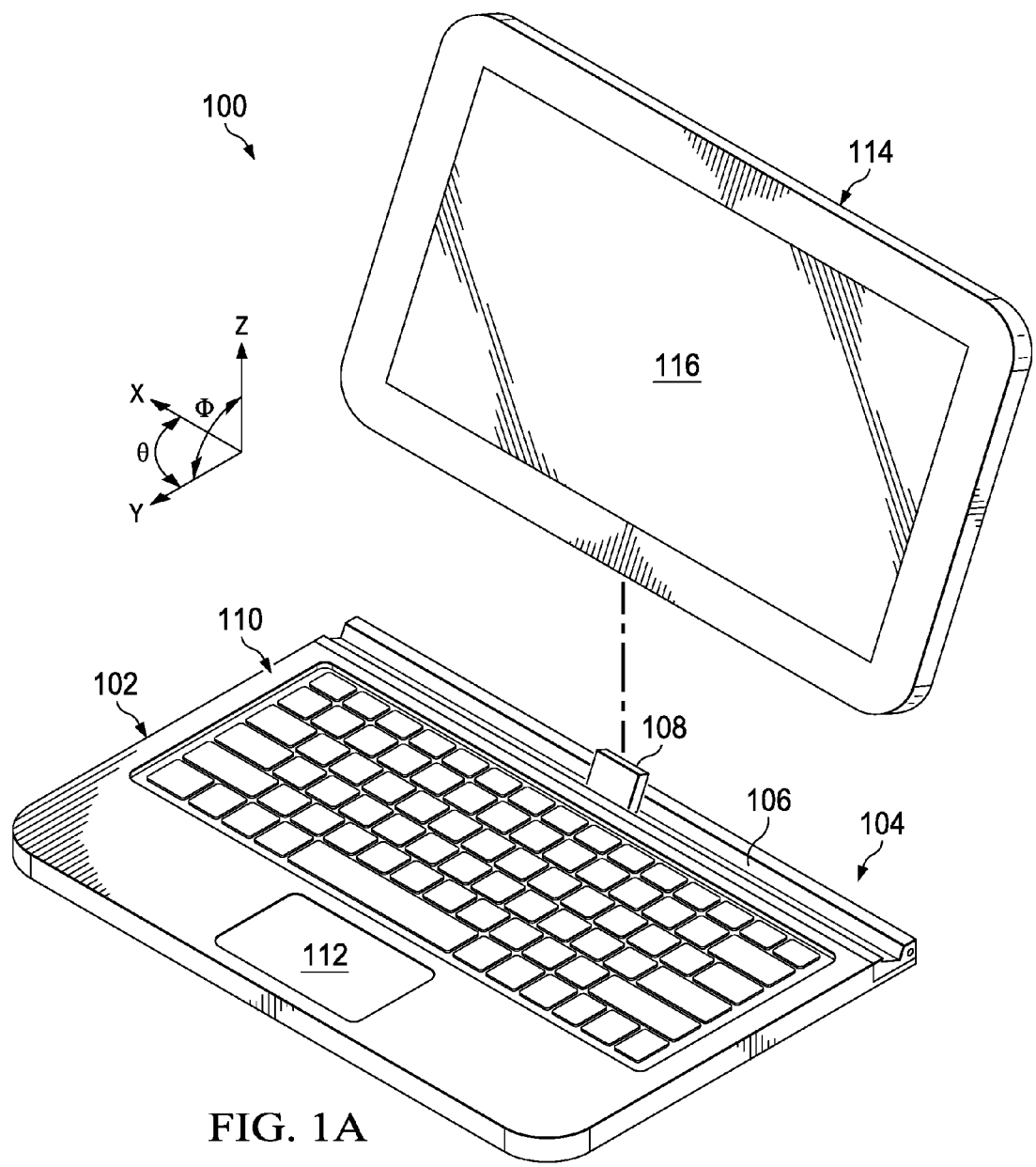
FIG. 1A is a schematic diagram of an example computing system in accordance with embodiments of the present disclosure.

FIG. 1A is a schematic diagram of an example computing system 100 in accordance with embodiments of the present disclosure. The computing system 100 includes a computer dock 102 and a tablet 114. The table 114 is configured to connect to the computer dock 102 physically and via a communications protocol, such as a wired connection or by Bluetooth. The computer dock 102 can be a keyboard base for a tablet 114 or monitor component in a 2-in-1 computer. The computer dock 102 can include a keyboard 110 and a trackpad 112. The computer dock 102 can also include input/output ports, such as USB ports. The computer dock 102 can also include additional processors, batteries, and other computing components.

The computer dock 102 also includes a hinge assembly 104. The hinge assembly 104 can include a cradle 106 to physically receive the tablet 114. Additionally, the hinge assembly 104 can include an electrical contact 108 to facilitate communications and power to the tablet 114.

Figure 1B:
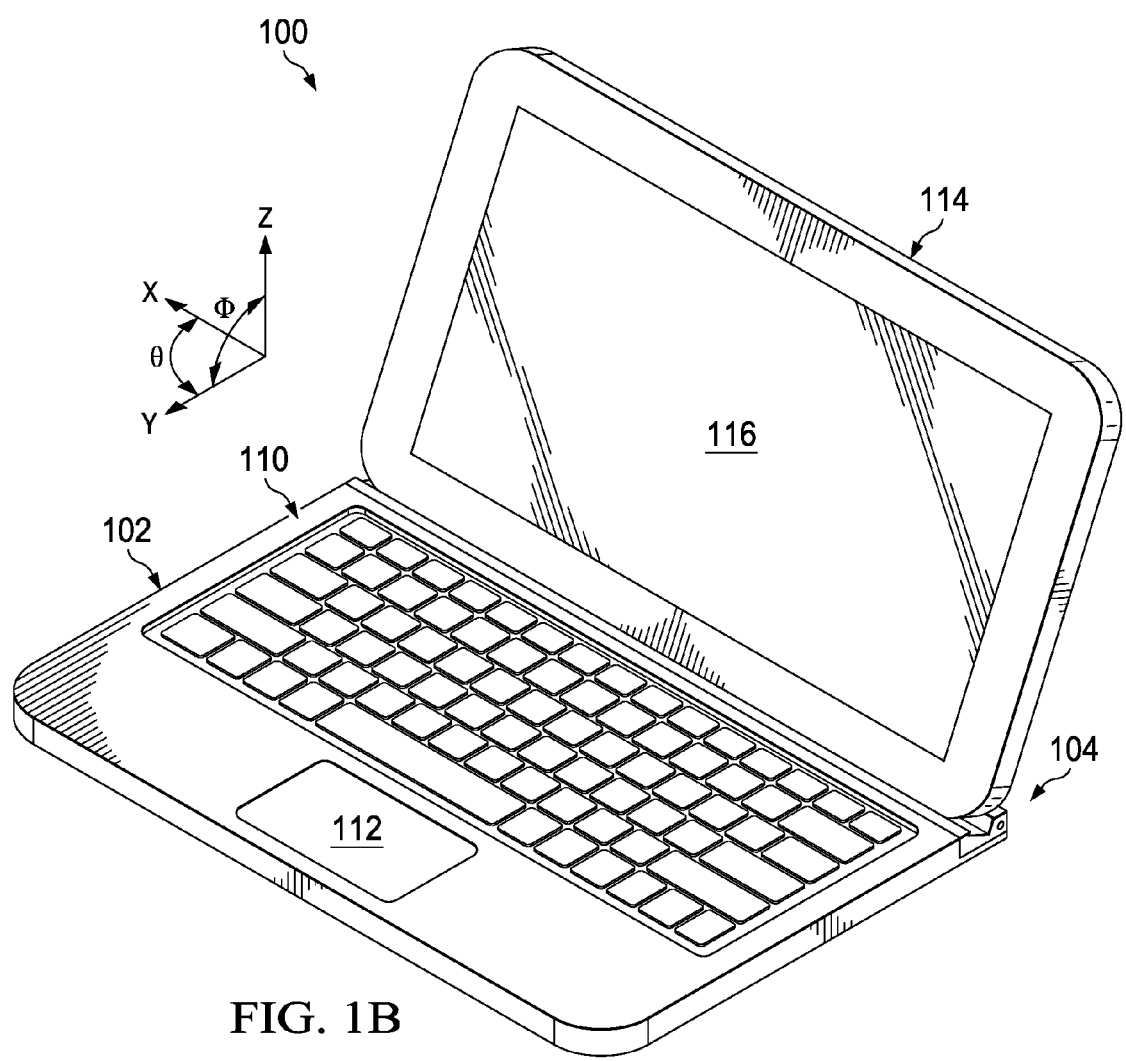
FIG. 1B is a schematic diagram of an example computing system in accordance with embodiments of the present disclosure.

FIG. 1B is a schematic diagram of an example computing system in accordance with embodiments of the present disclosure. FIG. 1B shows the tablet 114 connected to the computer dock 102.

Included in FIG. 1B is a coordinate system for reference throughout the disclosure. The x-direction (or x-axis) is defined as a direction along the length of the computer dock. The y-direction (or y-axis) is defined as a direction along the width of the computer dock. The z-direction (or z-axis) is defined as a direction along the height or thickness of the computer dock. The theta (θ) direction is an angular direction in the x-y plane; and the phi (φ) direction is an angular direction between the z-direction and the x-y plane. The term "axial" is used in this disclosure to refer to the x-direction, shown in FIG. 1B. The tablet can be opened and closed by rotation of the hinges in the φ direction (e.g., rotation about the x-axis).

Embodiment 1

Figure 2:
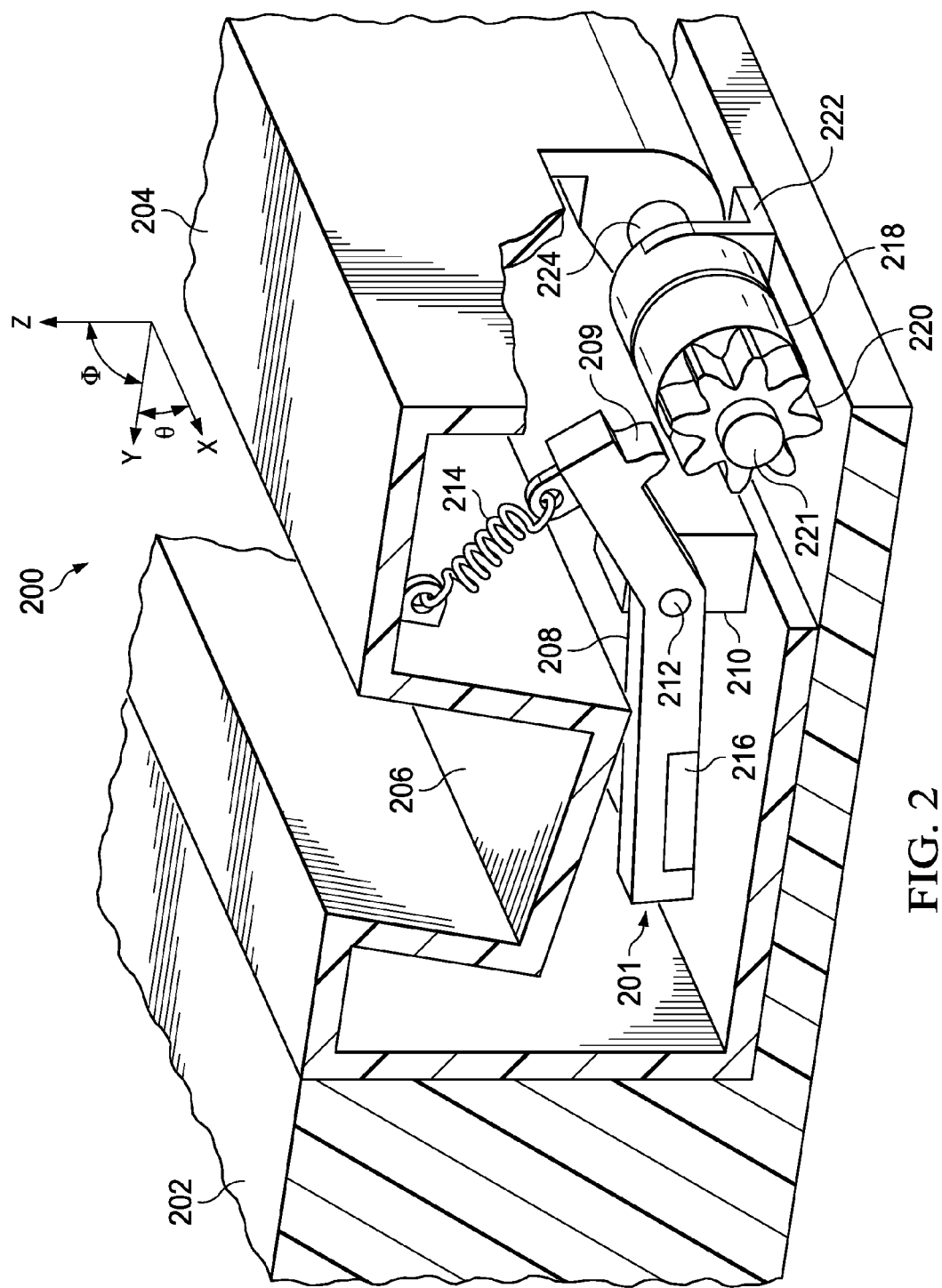
FIG. 2 is a schematic diagram of a computer dock that includes a friction hinge engagement mechanism in accordance with embodiments of the present disclosure.

FIG. 2 is a schematic diagram of a computer dock 200 that includes a friction hinge engagement mechanism in accordance with embodiments of the present disclosure. The computer dock 200 includes a keyboard housing 202 and a hinge assembly housing 204. The hinge assembly 204 includes a hinge cradle 206 configured to receive a tablet, and is where the tablet would attach into a slot or onto tabs.

The hinge assembly housing 204 houses the friction element 218. The friction element 218 can be a torque engine or other frictional rotation device. The friction element 218 is rigidly affixed to the keyboard housing 202 by a bracket 222. A gear or other cogged element 220 is affixed to a common axial member 221 and is coaxial to the friction element 218. When the gear 220 rotates, the friction element 218 also rotates, and vice versa. The bracket 222 can also support an axial member 224, which can be a pin or a long, cylindrical member about which the hinge assembly housing 204 can freely rotate.

The hinge assembly housing 204 houses the friction hinge engagement mechanism 201, which includes a lever arm 208 physically connected to the hinge assembly housing 204 by a pivot pin 212 and pivot support 210. Pivot support 210 is rigidly affixed to the hinge assembly housing 204, and may be incorporated into 222. The lever arm 208 is also connected to the hinge assembly housing 204 by a spring 214. The spring 214 tension biases the lever arm 208 away from the gear 220 of the friction element 218. The lever arm 208 also includes a magnet 216. Magnet 216 is attracted to ferrous metal or mating magnet in the tablet when the tablet is received by the cradle 206. The magnet 216 is configured such that the magnetic force between the magnet 216 and the tablet causes the lever arm 208 to rotate about the pivot point 212. The magnetic force would overcome the spring tension of the spring 214. The rotation of the lever arm 208 in the presence of the tablet causes the "tooth" or mating cog 209 on the end of the lever arm 208 to engage the gear 220. Engagement of the gear 220 by the lever arm 208 rotationally couples to the friction element 218, rigidly linking the hinge assembly housing 204 with the friction element 218. When the friction element 218 is engaged and mechanically linked to the hinge assembly housing 204, the friction element 218 creates a "friction hinge" between the hinge assembly housing 204 and base 202. The friction hinge results in the hinge assembly housing 204 experiencing resistance to rotational movement about the axial member 224. Member 224 constrains the degrees of freedom of 204 to only allow its rotation relative to 202 about the X-axis. Once the friction element 218 is engaged, the mechanical connection between 201, and 218 provides torsional resistance to 204 as it rotates about the X-axis.

Removal of the tablet causes the magnetic force that overcomes the spring 214 to dissipate, and the spring 214 pulls the lever arm 208 out of the gear 220, disengaging the friction element 218 (i.e., uncoupling the friction element 218 to the hinge assembly housing 204). The hinge assembly housing 204 is free to rotate about the axial member 224 without resistance from the friction element 218. To retain 204 in a closed position, a magnet, spring, detent plunger, low friction hinge, or similar device (not shown) may be incorporated to prevent 204 from opening when the base 202 is handled without a tablet attached.

Figure 3A:
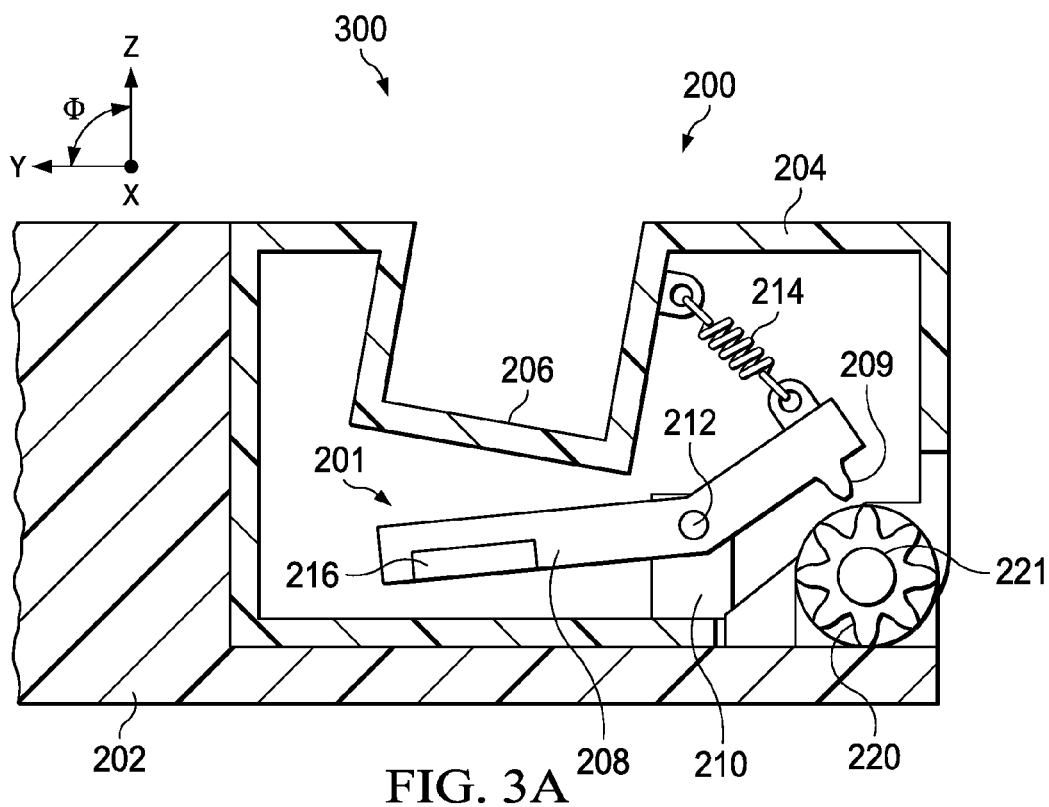
FIG. 3A is a schematic diagram of a computer dock that includes a friction hinge engagement mechanism in accordance with embodiments of the present disclosure.
Figure 3B:
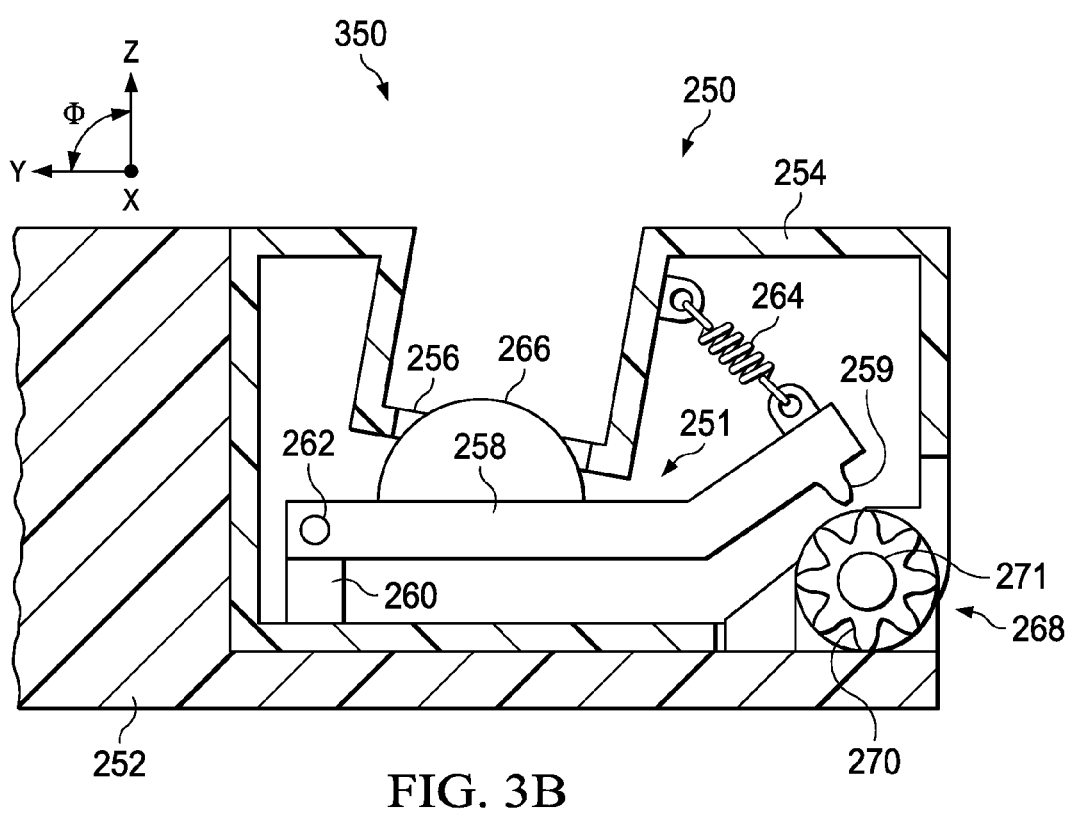
FIG. 3B is a schematic diagram of a computer dock that includes a friction hinge engagement mechanism in accordance with embodiments of the present disclosure.
Figure 4:
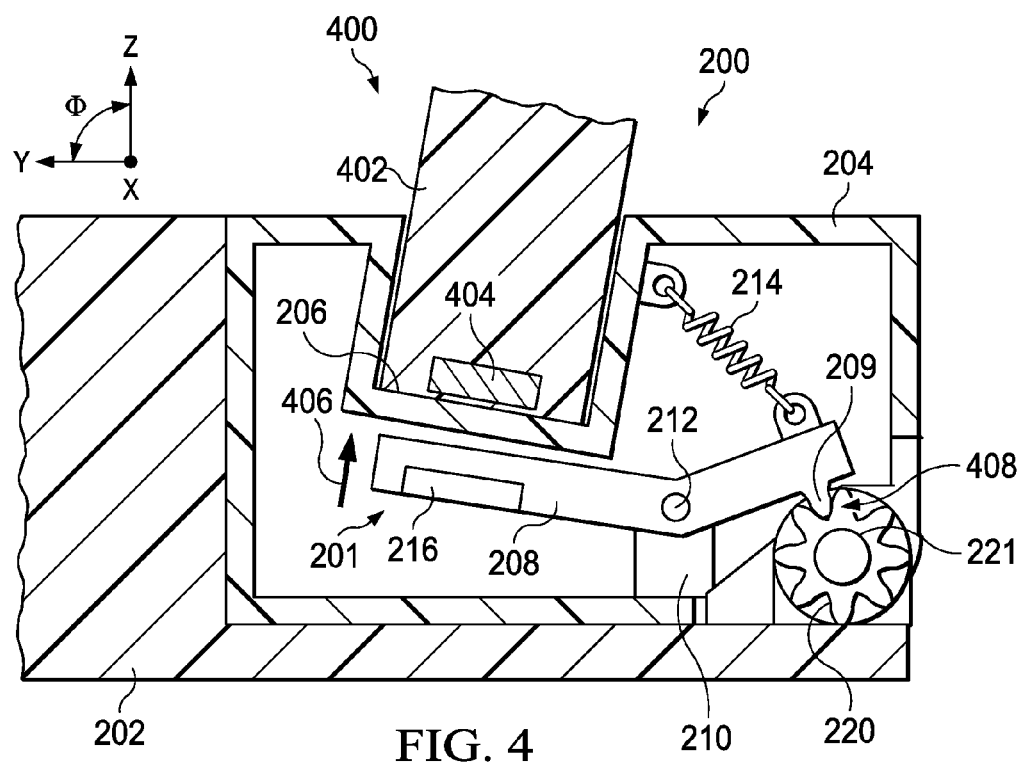
FIG. 4 is a schematic diagram of a computer dock that includes a friction hinge engagement mechanism and a received tablet in accordance with embodiments of the present disclosure.
Figure 5:
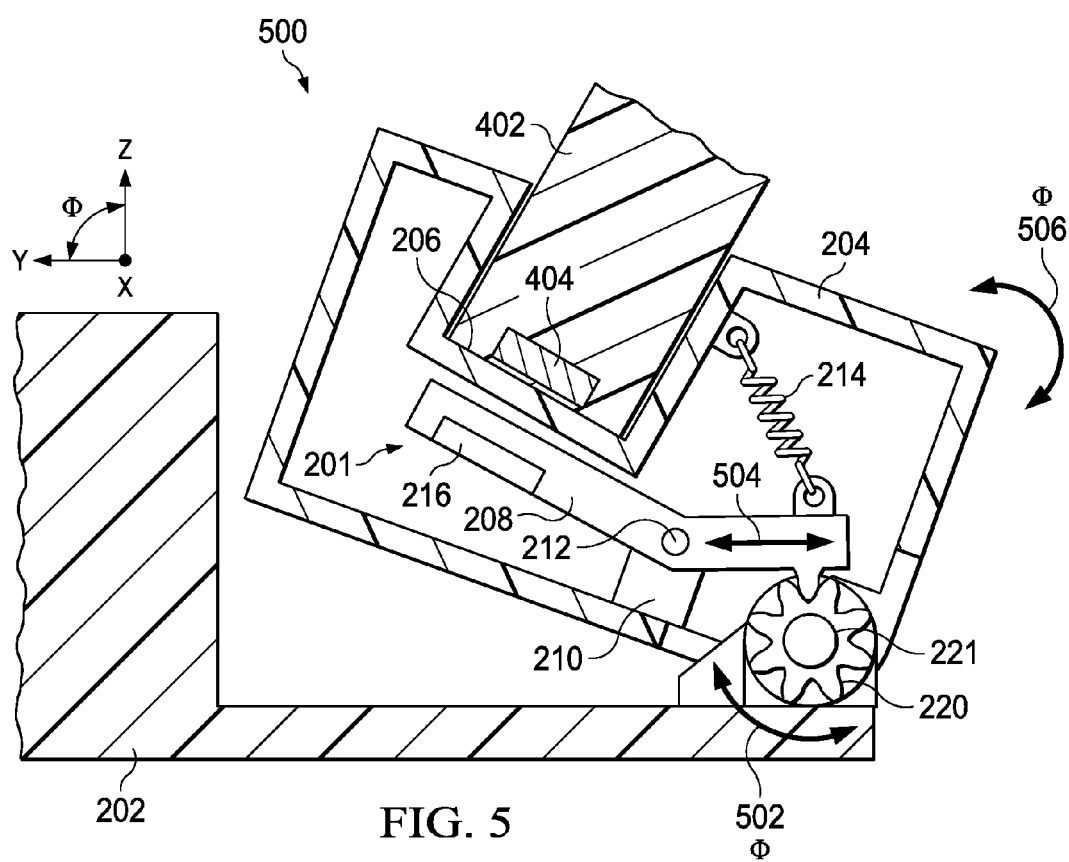
FIG. 5 is a schematic diagram of a computer dock that includes a friction hinge engagement mechanism and a received tablet in accordance with embodiments of the present disclosure.
Figure 6:
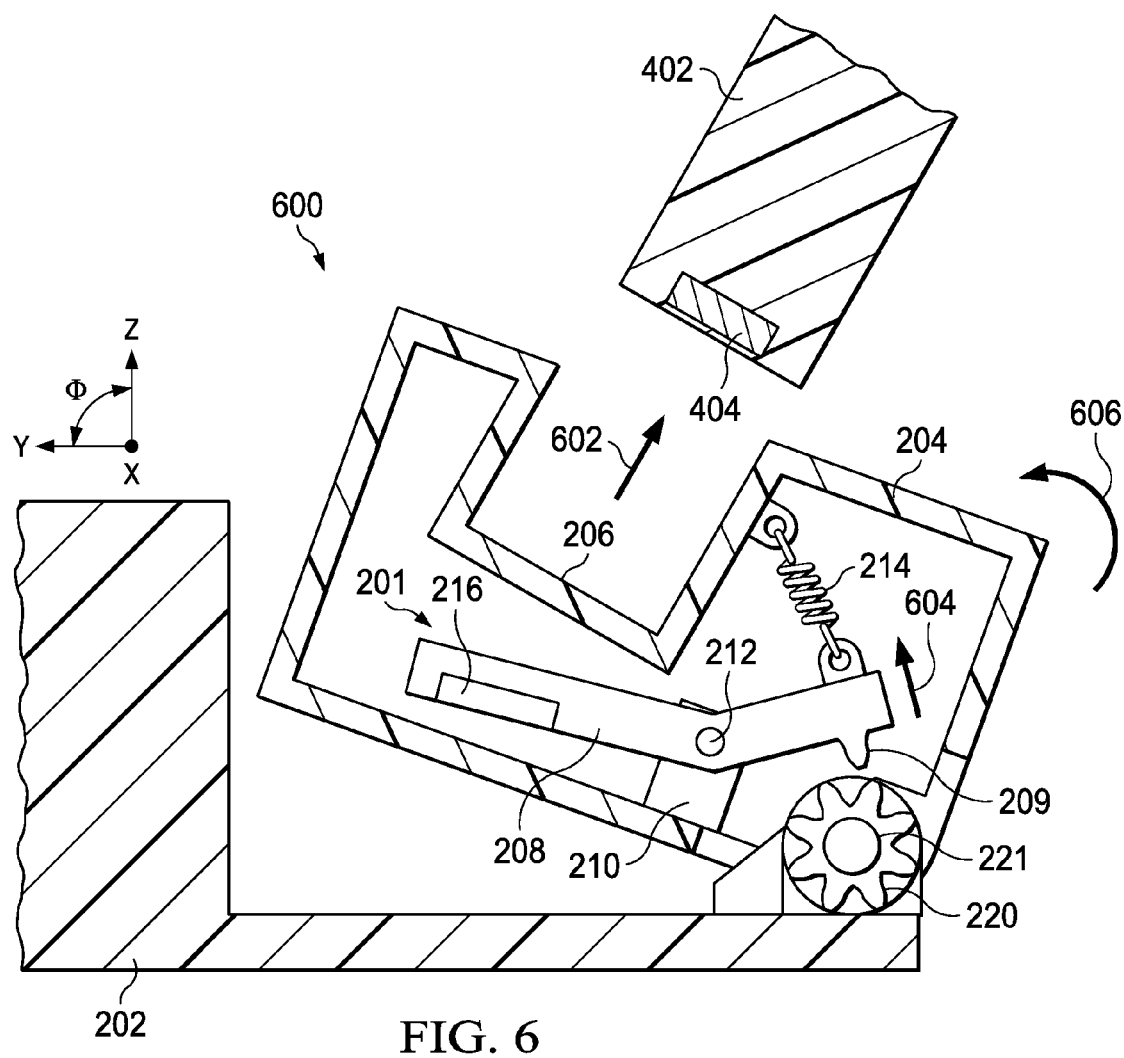
FIG. 6 is a schematic diagram of a computer dock that includes a friction hinge engagement mechanism in accordance with embodiments of the present disclosure.

FIGS. 3-6 illustrate operation of the friction hinge engagement mechanism. FIGS. 3A and 3B shows a "starting position," where the hinge assembly housing 204 is in an initial position and the friction element is not engaged. FIG. 4 shows the introduction of a tablet 402 into the cradle 206, which causes the friction hinge engagement mechanism 201 to engage the friction element 218. FIG. 5 shows the rotation of the hinge assembly housing 204. FIG. 6 shows removal of the tablet 402 from the cradle 206 and the resulting disengagement of the friction element 218.

FIG. 3A is a schematic diagram 300 of a computer dock 200 that includes a friction hinge engagement mechanism 201 in accordance with embodiments of the present disclosure. FIG. 3A shows computer dock 200 from FIG. 2 from a cross-sectional, side-view perspective. Like reference numbers represent like features. The computer dock 200 includes a base 202 and a hinge assembly housing 204. The hinge assembly housing 204 is connected to the base 202 by a hinge (not shown in FIG. 3A), and in this initial position, the hinge assembly housing 204 can rotate about the hinge without resistance from the friction element 218—which is disengaged.

A lever arm 208 includes a tooth 209 and a magnetic element 216. The magnetic element 216 can be oriented to attract to a metal or a magnet located in the tablet (shown in FIG. 4). The lever arm 208 can rotate about a pivot 212 that is attached to the hinge assembly housing 204 by a bracket 210. The lever arm 208 has a return spring 214 or other mechanism that disengages the lever arm 208 from the friction element 218 when a tablet is removed. The hinge assembly housing 204 is disconnected from the friction element 218 and is constrained by an axial connection such as a hinge pin attached to the base 202 (e.g., hinge pin 224 of FIG. 2). While the base is in the condition shown in FIG. 3A, the cradle 206 does not have a tablet yet, and so the hinge assembly housing 204 is free to rotate, and the lever arm is held in the "zero" position by the return spring 214.

The friction element 218 includes a cog or gear 220 that the lever are 208 can engage. Friction is generated in a typical manner used in mobile PC hinges. Gear 220 is affixed to an axial member 221 common to the gear and to the friction element 218 and is coaxial to the friction element 218.

In some embodiments, the hinge assembly housing 204 can be connected to the base 202 by a hinge pin. In some embodiments, a damping element can be used to cushion the hinge assembly housing 204 motion while the toothed lever 208 is disengaged.

FIG. 3B is a schematic diagram 350 of a computer dock 250 that includes a friction hinge engagement mechanism 251 in accordance with embodiments of the present disclosure. The computer dock 250 includes a base 252 and a hinge assembly housing 254. The hinge assembly housing 254 is connected to the base 252 by a hinge (not shown in FIG. 3B), and in this initial position, the hinge assembly housing 254 can rotate about the hinge without resistance from the friction element 268—which is disengaged in FIG. 3B.

A lever arm 258 includes a tooth 259 and a tab 266. The tab 266 can extend into the cradle 256 or can be on the side(s) of the hinge assembly housing 254. Upon receiving a tablet into the cradle 256, the tablet pushes on the tab 266 and causes the lever arm 258 to rotate about the pivot point 262. The lever arm 258 can rotate about a pivot 262 that is attached to the hinge assembly housing 254 by a bracket 260. The lever arm 258 has a return spring 264 or other mechanism that disengages the lever arm 258 from the friction element gear 270 when a tablet is removed. The hinge assembly housing 254 is disconnected from the friction element 268 and is constrained by an axial connection such as a hinge pin attached to the base 252 (e.g., hinge pin 224 of FIG. 2). While the base is in the state shown in FIG. 3B, the cradle 256 does not have a tablet yet, and so the hinge assembly housing 254 is free to rotate, and the lever arm is held in the "zero" position by the return spring 264.

The friction element 268 includes a cog or gear 270 that the lever are 258 can engage. Friction is generated in a typical manner used in mobile PC hinges. Gear 270 is affixed to an axial member 271 common to the gear and to the friction element 268 and is coaxial to the friction element 268.

In some embodiments, the hinge assembly housing 254 can be connected to the base 252 by a hinge pin. In some embodiments, a damping element can be used to cushion the hinge assembly housing 254 motion while the toothed lever 258 is disengaged.

The lever arm 258 can include a tooth 259 that can engage the gear 270 when the tablet pushes on the tab 266. When the table is removed from the cradle 256, the return spring 264 can pull the end of the lever arm 258 out of engagement with the gear 270.

Friction Element Engagement

FIG. 4 is a schematic diagram 400 of a computer dock 200 that includes a friction hinge engagement mechanism 201 and a tablet 402 received in cradle 206 in accordance with embodiments of the present disclosure. In some instances, metallic elements in the tablet 402 can attract magnet 216. In some instances, the bottom of the tablet 402 include magnets 404 that attract the magnet 216 in the lever arm 208. The magnetic attraction between the magnet 216 and the tablet 402 causes the toothed lever 208 in the indicated direction 406 (clockwise in FIG. 4). The metal or magnet 404 in the tablet may also be used to secure the tablet to the base, compress spring pins for interconnect or other alternative usages. The attractive force between magnet 216 and tablet 402 must be large enough to hold the engagement tooth 209 into the cog 220 of the friction element 218 (engagement shown as 408). In some instances, a tab (30X in FIG. 3B) is displaced by the tablet when inserted into 206, driving engagement between 208 and 220.

FIG. 5 is a schematic diagram 500 of a computer dock 200 that includes a friction hinge engagement mechanism 201 and a received tablet 402 in accordance with embodiments of the present disclosure. In the engaged state, any pivoting 506 of the hinge assembly housing 204 with the tablet 402 within the cradle 206 generates forces 504 that are transferred through the toothed lever 208 to the friction element 218 creating a resisting torque 502 that holds the tablet 402 in position. While the toothed lever 208 is engaged, the friction element 218 will resist torques applied in either clockwise or counter-clockwise directions.

FIG. 6 is a schematic diagram 600 of a computer dock 200 that includes a friction hinge engagement mechanism 201 disengaged from a friction element 218 in accordance with embodiments of the present disclosure. When the tablet 402 is detached (602), there is no longer a magnetic attraction between the magnet 216 and the tablet 402, and the toothed lever 218 is released. The return spring 214 retracts (604) the engagement tooth 209 from the friction element 218. Once retracted, the hinge assembly housing 204 is free to rotate without the added resistance from the friction hinge. Damping elements may be added to the cradle to slow the pivoting of the cradle as it returns to its zero position (not shown).

Embodiment 2

Figure 7:
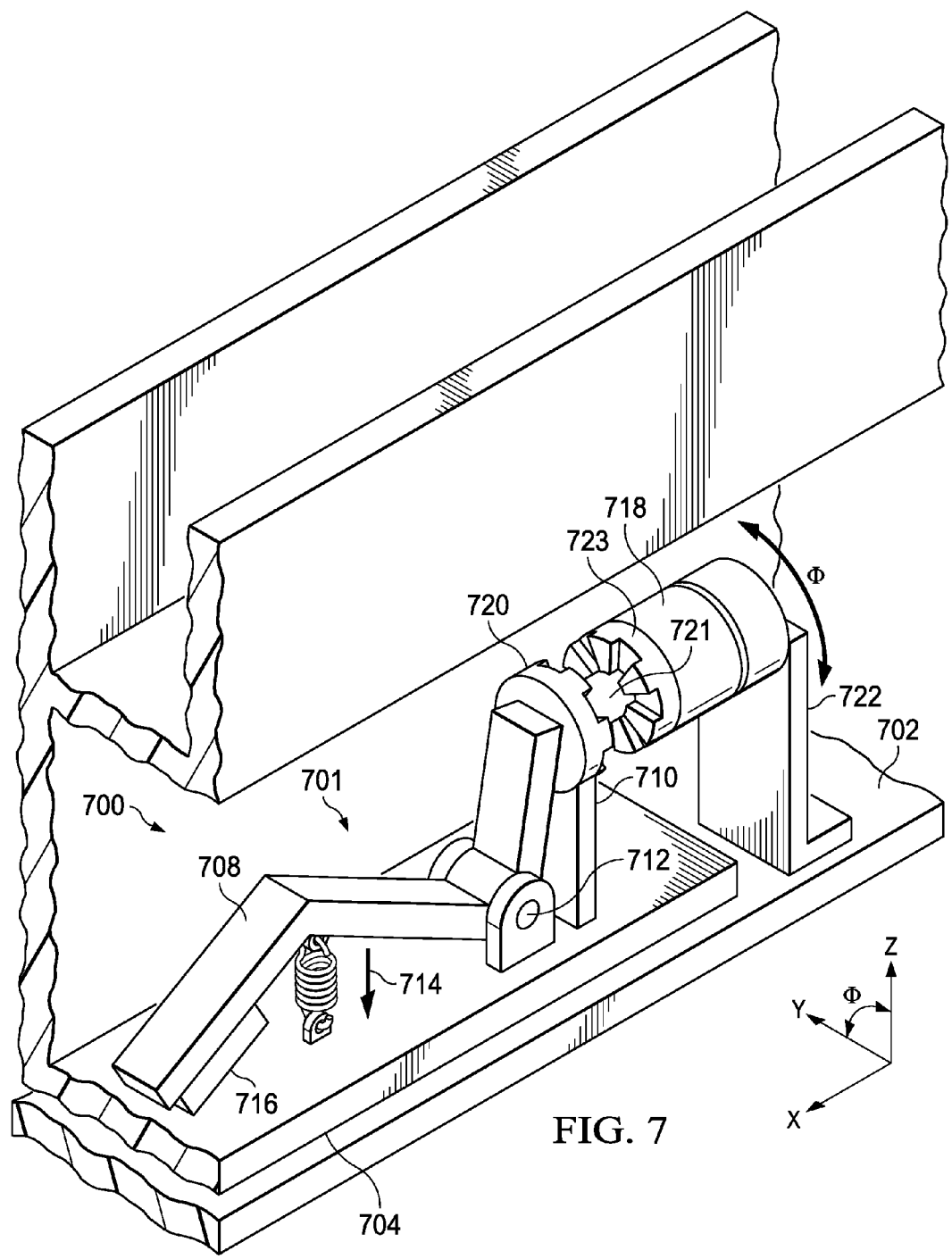
FIG. 7 is a schematic diagram of a friction hinge engagement mechanism in accordance with embodiments of the present disclosure.
Figure 8:
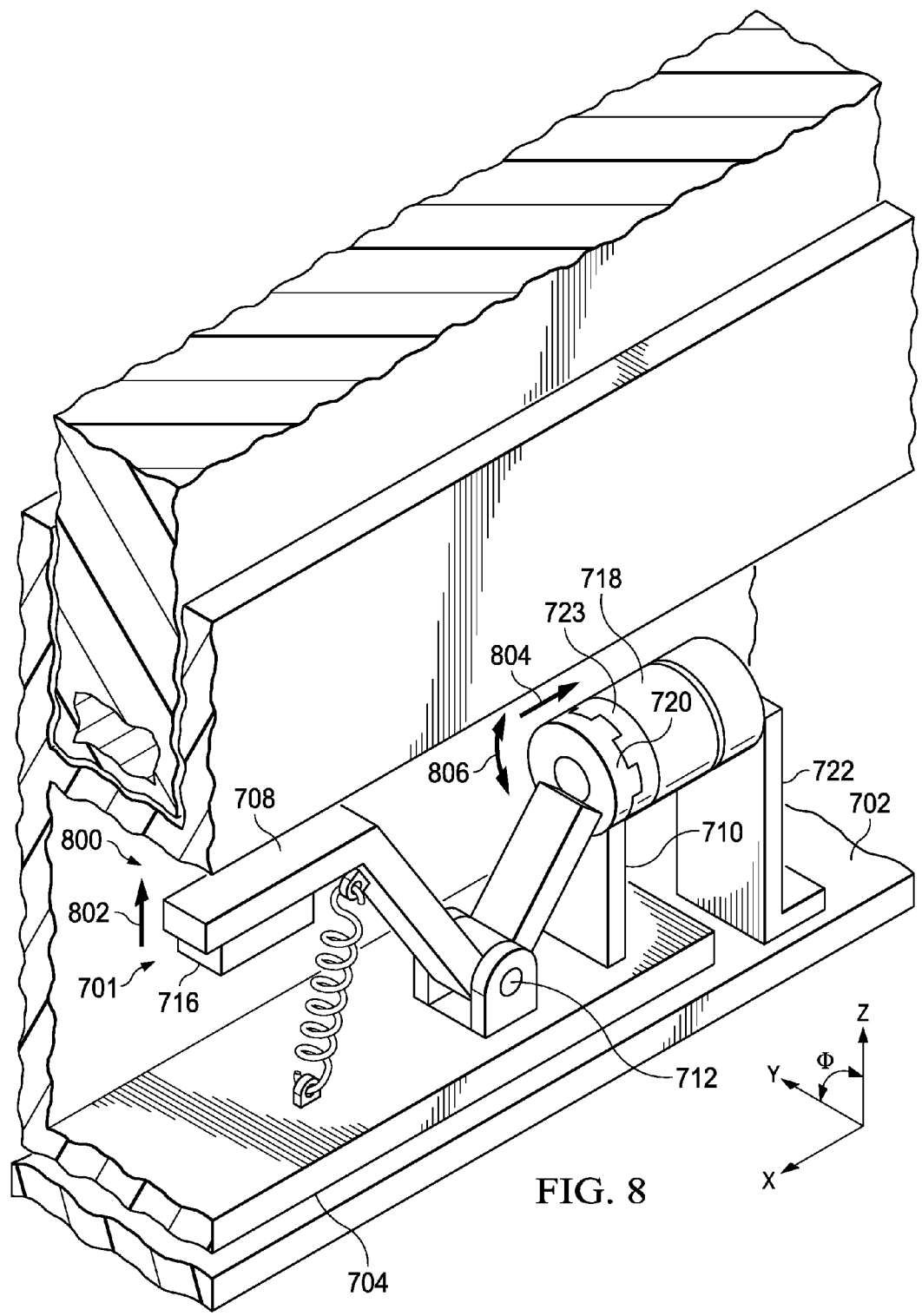
FIG. 8 is a schematic diagram of a friction hinge engagement mechanism in accordance with embodiments of the present disclosure.

FIGS. 7-8 illustrate another embodiment of a friction hinge engagement mechanism 701 with a linkage 708 aligned axially with the hinge and the friction element 718. FIG. 7 is a schematic diagram of a friction hinge engagement mechanism 701 in accordance with embodiments of the present disclosure. In FIG. 7, no tablet has been introduced. A tablet would be inserted along the Z-axis in this embodiment. A computer dock 700 can include a base 702, similar to base 202. The computer dock 700 also includes a hinge assembly housing 704. The hinge assembly housing 704 also includes a friction hinge engagement mechanism 701. 704 rotates about the X-axis relative to 702, concentric with 721. The friction hinge engagement mechanism 701 includes a linkage 708, similar to the toothed lever 208 above, includes a magnet 716 orientated to be attracted to the mating magnet in the tablet, not shown. Alternatively, a tab (5000) may replace magnet to achieve same behavior. This linkage 708 is connected to the hinge assembly housing 704 and can pivot about a pivot point 712, and a force (714) is applied via a spring or similar mechanism to hold the linkage 708 in position when the tablet is absent. Mating face gears or a mating internal and external gear pair (720 & 723) are concentric with axle 721. Friction element 718 is fixed to 722 bracket, which is fixed to 704. Mating element 723 is fixed to the friction element 718, such that resisting torque is applied when 723 is rotated in Phi. Mating element 720 is rotationally coupled to 710, such that any torque applied to 720 is transferred to 704. Mating element 720 is constrained to freely translate along axle 721. Translation of 720 is driven by pivoting 708 about 712. 720 may be attached by linkage to 708 or a compression spring or similar device may be inserted between 720 and 723 to ensure disengagement of the mating elements. The friction element 718 is fixed to the base structure 702 by a bracket or other structure 722.

FIG. 8 is a schematic diagram 800 of a friction hinge engagement mechanism 701 in accordance with embodiments of the present disclosure. In FIG. 8, a tablet (not shown) is introduced to the hinge assembly housing 704. When a tablet is attached to the base or dock, a magnet or metal in the tablet attracts magnet 716 by a magnetic force (802). The resulting rotation of the linkage 708 about pivot 712 axially displaces (804) mating element 720 until mating element 720 couples to mating element 723. Once the mating elements 720 and 723 are coupled, the hinge assembly housing 702 is coupled to the friction element 718.

Torque (806) is generated by tilting the tablet. Torque (806) can be transferred from the hinge assembly housing 704 to the friction element 718, and friction element 718 resists the resulting rotation from the torque (806).

Removal of the table removes the magnetic force, and the spring 714 causes the linkage 708 to axially displace the mating element 720 away from the mating element 723 and away from friction element 718.

Embodiment 3

Figure 9:
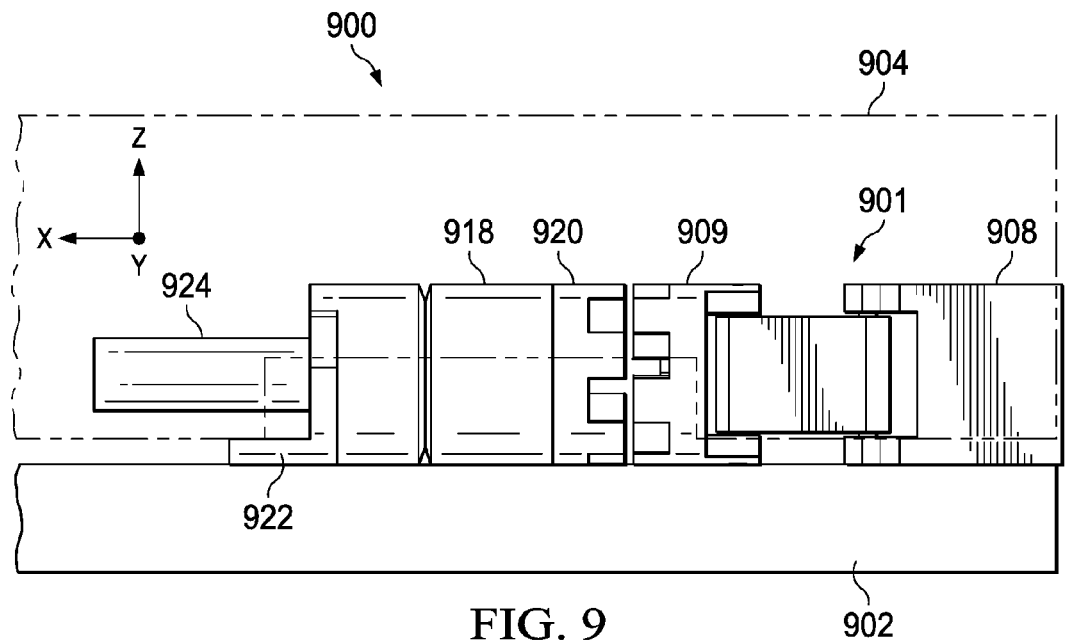
FIG. 9 is a schematic diagram of a computer dock that includes a friction hinge engagement mechanism in accordance with embodiments of the present disclosure.
Figure 10:
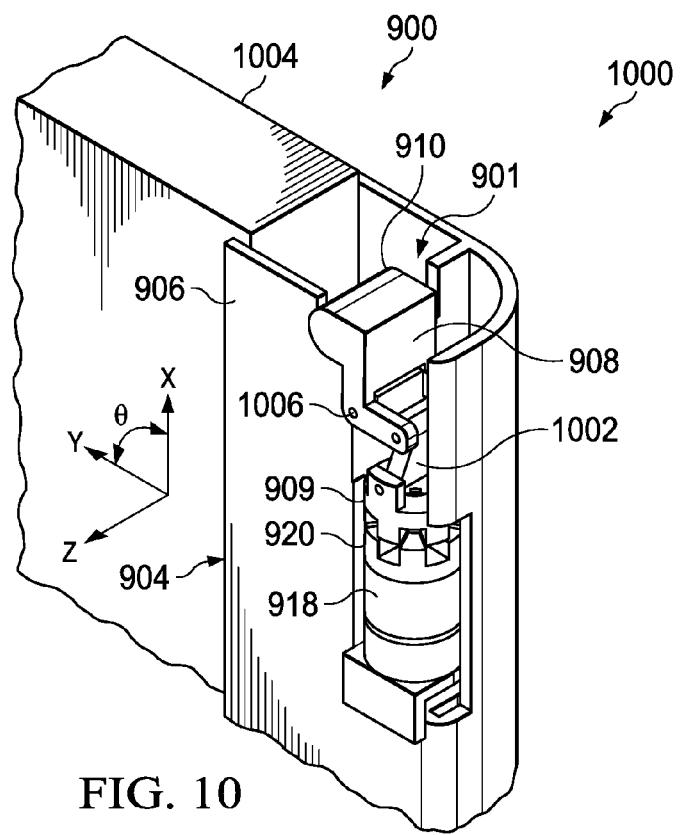
FIG. 10 is a schematic diagram of a computer dock that includes a friction hinge engagement mechanism in accordance with embodiments of the present disclosure.
Figure 11:
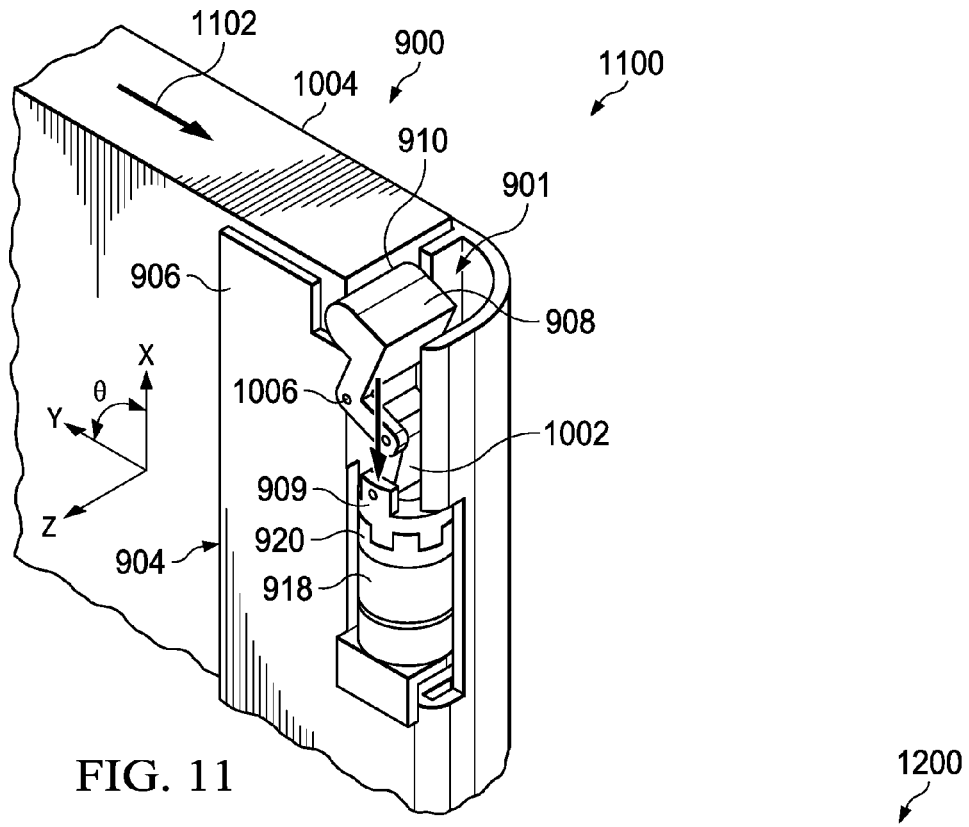
FIG. 11 is a schematic diagram of a computer dock that includes a friction hinge engagement mechanism in accordance with embodiments of the present disclosure.

FIGS. 9-11 illustrate another embodiment of the disclosure. In FIGS. 9-11, a mechanical tab on the linkage is used instead of a magnet to couple the friction element to the hinge assembly housing. This embodiment is similar to the axially engaging hinge engagement mechanism of FIG. 7-8. Usage of the mechanical tab is also applicable to the radially engaging mechanism of FIG. 2-6.

FIG. 9 is a schematic diagram of a computer dock 900 that includes a friction hinge engagement mechanism 901 in accordance with embodiments of the present disclosure. The computer dock 900 uses a tab 910 as part of the linkage 908 to displace a mating element 909 to engage with mating element 920 affixed to friction element 918. The computer dock 900 includes a base 902 and a hinge assembly housing 904. The linkage 908 is affixed to the hinge assembly housing 904. The friction element 918 is affixed to the base 902 by a bracket 922. The hinge assembly housing 904 is also coupled to the base by a pivot attachment 924, allowing 904 to rotate relative to 902 along the X-axis.

The linkage 908 is coupled to a mating element 909. Similarly, the friction element 918 is coupled to a mating element 920. Mating element 909 is configured to mate with mating element 920. Mating element 909 is rotationally coupled to 904, and is free to translate along the X-axis. When mating element 909 and mating element 920 are mated, the hinge assembly housing 904 is coupled to the friction element 918.

FIG. 10 is a schematic diagram of a computer dock 900 that includes a friction hinge engagement mechanism 901 in accordance with embodiments of the present disclosure. FIG. 10 shows a top-down, cut-away view of the computer dock 900 with base 902 not shown. The linkage 908 includes a tab shape end 910 that protrudes into the space the tablet occupies when fully attached to the base, and contacts a tablet 1004 when the tablet is fully attached. The linkage 908 is pivotally affixed to the hinge assembly housing 904 by a pivot 1006. The linkage 908 can pivot about the pivot 1006 in the θ direction. The linkage 908 also includes a mating link 1002 affixed to the linkage by a pivot point and can pivot on the linkage end in the θ direction. The link 1002 is affixed on an opposite end to a mating element 909. Rotation of the linkage 908 in the θ direction causes axial displacement of the link 1002 (i.e., displacement in the x-direction). The mating element 909 is configured to mate with mating element 920 that is affixed to the friction element 918.

The hinge assembly housing 904 includes a cradle 906 that can receive a table 1004. The cradle 906 can include an opening to allow the tab 910 of the linkage 908 to contact a received tablet 1004, shown more in FIG. 11.

FIG. 11 is a schematic diagram of a computer dock 900 that includes a friction hinge engagement mechanism 901 in accordance with embodiments of the present disclosure. FIG. 11 is a top-down cut away view of the computer dock 900 and is the same view as FIG. 10. In FIG. 11, the tablet 1004 is received and fully inserted into the cradle 906 of the hinge assembly housing 904. The tablet 1004 applies a force 1102 on the tab 910 in the y direction, which causes the linkage 908 to pivot about the pivot 1006 in the θ direction. The pivoting of the linkage 908 causes the link 1002 to move axially. The axial movement of the link 1002 causes the mating element 909 to mate with the mating element 920, thereby engaging the friction element 918.

Figure 12:
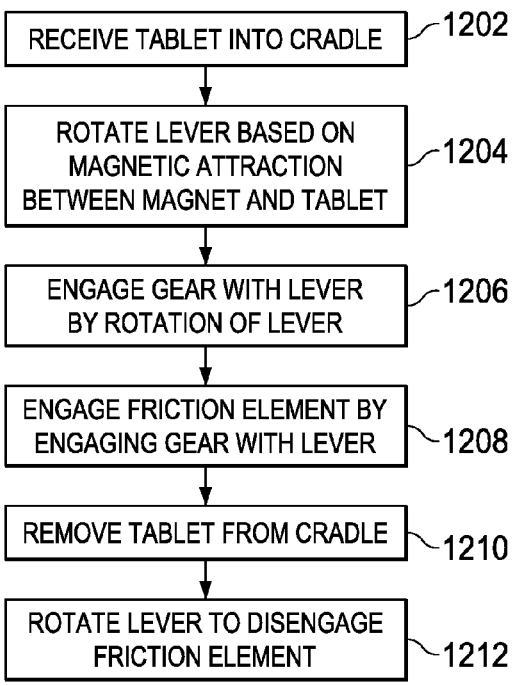
FIG. 12 is a process flow diagram for engaging a friction element in a computer dock in accordance with embodiments of the present disclosure.

FIG. 12 is a process flow diagram 1200 for engaging a friction element in a computer dock in accordance with embodiments of the present disclosure. A cradle of a hinge assembly housing can receive a tablet (1202). A magnet affixed to a lever arm in the hinge assembly housing is attracted to the tablet (by a magnet in the tablet or by metal in the tablet). The magnetic attraction between the magnet and the tablet causes the lever arm to pivot about a pivot point attached to the hinge assembly housing (1204). The lever arm has a tooth on an opposite side as the magnet, the pivot point between the magnet and the tooth. Thus, rotation of the magnet towards the tablet causes the tooth to rotate and engage a gear or cog or other mating element affixed to the friction element (1206). Engagement of the cog by the tooth on the lever arm causes the hinge assembly housing to engage to the friction element (1208).

The tablet can be removed from the cradle (1210). Removal of the tablet from the cradle causes a dissipation of the magnetic attraction between the magnet on the lever arm and the tablet. The dissipation of the magnetic attraction causes the lever arm to rotate, thereby pulling the tooth of the lever arm out of the gear or cog or mating element (1212). In some embodiments, a spring can be used to pull the lever arm in a direction opposing the magnetic attraction. Disengagement of the tooth from the gear causes the hinge assembly housing to disengage from the friction element.

In some embodiments, instead of a magnet, the lever arm can include a tab that extends into the cradle. Upon receiving the tablet into the cradle, the tablet pushes on the tab, which can cause the lever arm to rotate about a pivot point. The rotation of the lever arm about the pivot point in a first direction can cause the tooth of the lever arm to engage a gear coupled to a friction element. When the tablet is removed, the return spring connected to the lever arm pulls tooth of the lever arm out of engagement from the gear of the friction element.

Figure 13:
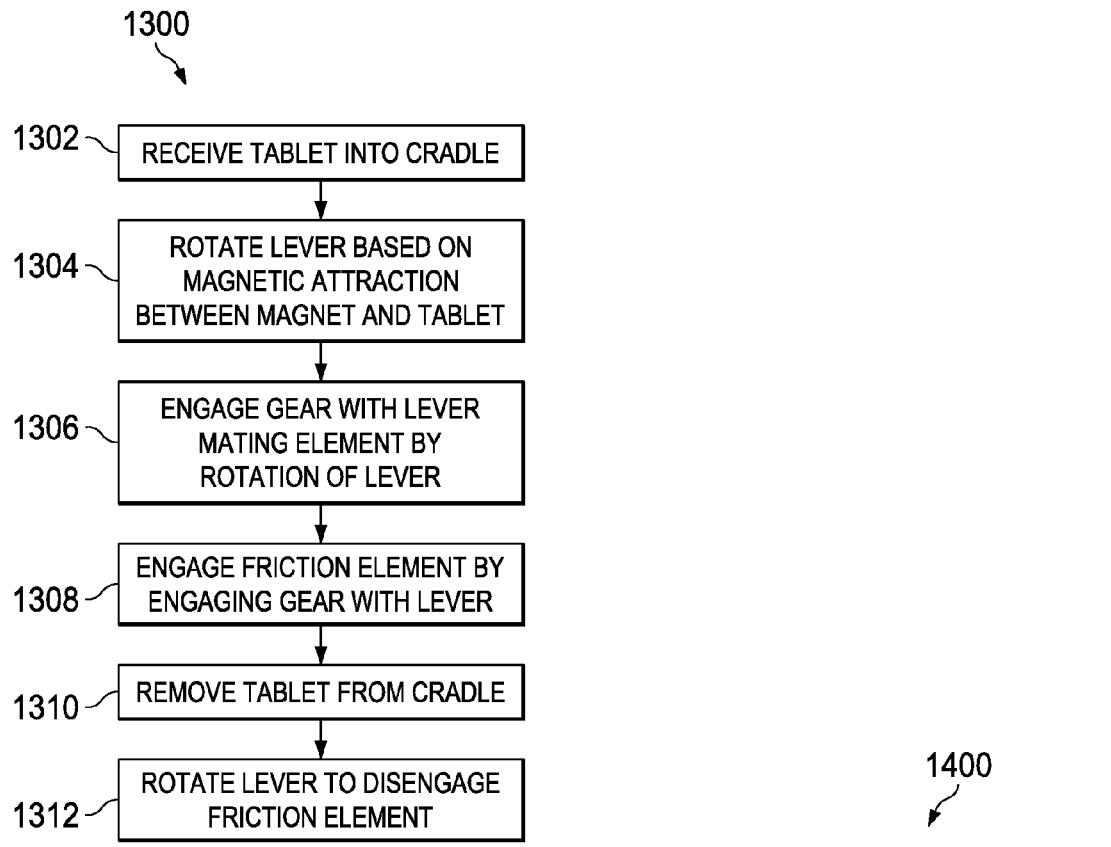
FIG. 13 is a process flow diagram for engaging a friction element in a computer dock in accordance with other embodiments of the present disclosure.

FIG. 13 is a process flow diagram for engaging a friction element in a computer dock in accordance with other embodiments of the present disclosure. A cradle of a hinge assembly housing can receive a tablet (1302). A magnet affixed to a lever arm in the hinge assembly housing is attracted to the tablet (by a magnet in the tablet or by metal in the tablet). The magnetic attraction between the magnet and the tablet causes the lever arm to pivot about a pivot point attached to the hinge assembly housing (1304). The lever arm has a tooth on an opposite side as the magnet, the pivot point between the magnet and the tooth. Thus, rotation of the magnet towards the tablet causes the tooth to rotate and engage a gear or cog or other mating element affixed to the friction element (1306). Engagement of the cog by the tooth on the lever arm causes the hinge assembly housing to engage to the friction element (1308).

The tablet can be removed from the cradle (1310). Removal of the tablet from the cradle causes a dissipation of the magnetic attraction between the magnet on the lever arm and the tablet. The dissipation of the magnetic attraction causes the lever arm to rotate, thereby pulling the tooth of the lever arm out of the gear or cog or mating element (1312). In some embodiments, a spring can be used to pull the lever arm in a direction opposing the magnetic attraction.

Disengagement of the tooth from the gear causes the hinge assembly housing to disengage from the friction element.

Embodiment 4

Figure 14:
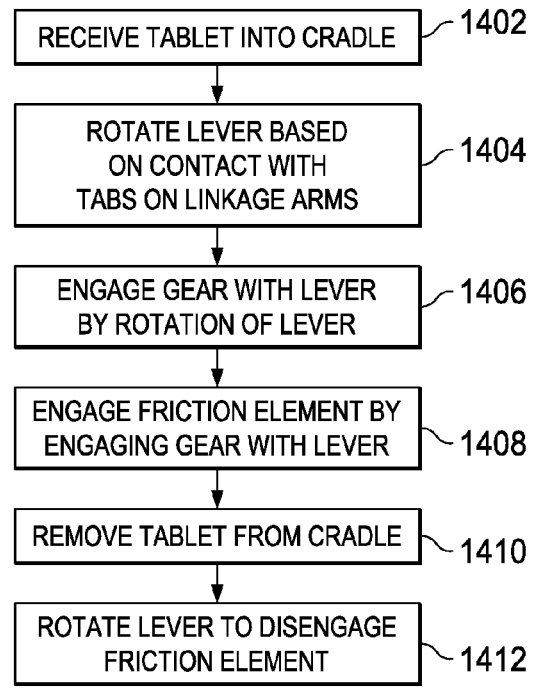
FIG. 14 is a process flow diagram for engaging a friction element in a computer dock in accordance with other embodiments of the present disclosure.

FIG. 14 is a process flow diagram for engaging a friction element in a computer dock in accordance with other embodiments of the present disclosure. A cradle of a hinge assembly housing can receive a tablet (1402). A mechanical tab affixed to a lever arm in the hinge assembly housing is displaced by the tablet. The tab displacement causes the lever arm to pivot about a pivot point attached to the hinge assembly housing (1404). The lever arm has a tooth on an opposite side as the tab, the pivot point is positioned such that displacing the tab will couple mating elements between the base and hinge cradle. Thus, rotation of the lever by the tablet causes the mating element to move and engage a gear or cog or other mating element affixed to the friction element (1406). Engagement of the mating element on the lever arm causes the hinge assembly housing to engage to the friction element (1408).

The tablet can be removed from the cradle (1410). Removal of the tablet from the cradle causes the tab to return to its original position. This movement of the tab causes the lever arm to rotate, thereby disengaging the mating elements from each other (1412). In some embodiments, a spring can be used to pull the lever arm to resist the insertion of the tablet, and return the lever arm to its original position. Disengagement of the mating elements causes the hinge assembly housing to disengage from the friction element.

The following paragraphs provide examples of various ones of the embodiments disclosed herein:

Example 1 is a computer dock that includes a housing coupled to the computer dock, the housing includes a cradle to receive a computing device, the housing coupled to the computer dock by a hinge pin and configured to rotate about the hinge pin about a first axis. A friction hinge can be rigidly affixed to the computer dock. A pivot arm can be affixed to the housing, the pivot arm configured to rotate about a pivot point. The pivot arm can include a first portion that includes a computing device engagement part to receive the computing device; and a second portion includes a friction hinge engagement part to engage with the friction hinge upon receiving the computing device in the cradle.

Example 2 may include the subject matter of example 1 wherein the computing device engagement part includes a magnet, wherein the magnet is configured to cause a magnetic attraction between the magnet and the computing device, the magnetic attraction to cause the pivot arm to pivot about the second axis and causing the friction hinge engagement part to engage with the friction hinge.

Example 3 may include the subject matter of example 1, wherein the computing device engagement part includes a tab, wherein the tab is configured to cause the pivot arm to pivot about the second axis and causing the friction hinge engagement part to engage with the friction hinge.

Example 4 may include the subject matter of example 3, wherein the second axis is substantially perpendicular to the first axis.

Example 5 may include the subject matter of any of examples 1 or 2 or 3 or 4, wherein the friction hinge includes a first mating gear and the friction hinge engagement part includes a second mating gear, the first mating gear configured to mate with the second mating gear.

Example 6 may include the subject matter of example 5, wherein the second mating gear is configured to move axially to engage the second mating gear.

Example 7 may include the subject matter of example 5, wherein the pivot arm is axially aligned with the friction hinge.

Example 8 may include the subject matter of any of examples 1 or 2 or 3 or 4 or 5 or 6 or 7 and also include a spring affixed to the second portion of the pivot arm and to the housing.

Example 9 may include the subject matter of any of examples 1 or 2 or 3 or 4 or 5 or 6 or 7 or 8, wherein the friction hinge includes a cog and the friction hinge engagement part includes a tooth configured to engage the cog.

Example 10 may include the subject matter of any of examples 1 or 2 or 3 or 4 or 5 or 6 or 7 or 8 or 9, wherein the friction hinge includes a torque hinge.

Example 11 may include the subject matter of any of examples 1 or 2 or 3 or 4 or 5 or 6 or 7 or 8 or 9 or 10, wherein the cradle includes an electrical connection to connect the computing device to the computer dock electronically.

Example 12 is a computing system that includes a computing device that includes a display. The computing system also includes a computer dock that includes a housing coupled to the computer dock, the housing includes a cradle to receive a computing device, the housing coupled to the computer dock by a hinge pin and configured to rotate about the hinge pin about a first axis. A friction hinge can be rigidly affixed to the computer dock. A pivot arm can be affixed to the housing, the pivot arm configured to rotate about a pivot point. The pivot arm can include a first portion that includes a computing device engagement part to receive the computing device and a second portion that includes a friction hinge engagement part to engage with the friction hinge upon receiving the computing device in the cradle.

Example 13 may include the subject matter of example 12, wherein the computing device engagement part includes a magnet, wherein the magnet is configured to cause a magnetic attraction between the magnet and the computing device, the magnetic attraction to cause the pivot arm to pivot about the second axis and causing the friction hinge engagement part to engage with the friction hinge.

Example 14 may include the subject matter of example 12, wherein the computing device engagement part includes a tab, wherein the tab is configured to cause the pivot arm to pivot about the second axis and causing the friction hinge engagement part to engage with the friction hinge.

Example 15 may include the subject matter of example 14, wherein the second axis is substantially perpendicular to the first axis.

Example 16 may include the subject matter of example 12 or 13 or 14 or 15, wherein the friction hinge includes a first mating gear and the friction hinge engagement part includes a second mating gear, the first mating gear configured to mate with the second mating gear, and wherein the second mating gear is configured to move axially to engage the second mating gear.

Example 17 may include the subject matter of example 16, wherein the pivot arm is axially aligned with the friction hinge.

Example 18 may include the subject matter of example 12 or 13 or 14 or 15 or 16 or 17, and also including a spring affixed to the second portion of the pivot arm and to the housing.

Example 19 may include the subject matter of example 12 or 13 or 14 or 15 or 16 or 17 or 18, wherein the friction hinge includes a cog and the friction hinge engagement part includes a tooth configured to engage the cog.

Example 20 may include the subject matter of example 12 or 13 or 14 or 15 or 16 or 17 or 18 or 19, wherein the friction hinge includes a torque hinge.

Example 21 may include the subject matter of example 12 or 13 or 14 or 15 or 16 or 17 or 18 or 19 or 20, wherein the cradle includes an electrical connection to connect the computing device to the computer dock electronically.

Example 22 is a method for engaging a friction hinge of a computer dock. The method can include receiving a tablet into a cradle of the computer dock; pivoting a lever arm about a pivot point; and engaging the friction hinge upon pivoting of the lever arm.

Example 23 may include the subject matter of example, wherein receiving the tablet into the cradle includes causing a magnetic attraction with a magnet affixed to the lever arm;

Example 24 may include the subject matter of example, wherein receiving the tablet into the cradle includes contacting a portion of the lever arm to cause the lever arm to pivot about a pivot point.

Example 25 may include the subject matter of example 23 or 34, wherein engaging the friction hinge includes engaging a mating element affixed to the friction hinge with the lever arm.

Example 26 may include the subject matter of example 23 or 24 or 25, wherein engaging the friction hinge includes engaging a mating element affixed to the friction hinge with a mating element coupled to the lever arm.

Example 27 is a computer dock that includes a housing coupled to the computer dock, the housing including a cradle to receive a computing device, the housing coupled to the computer dock by a hinge pin and configured to rotate about the hinge pin about a first axis. A friction hinge can be rigidly affixed to the computer dock. A friction hinge engagement means can be affixed to the housing, the friction hinge engagement means configured to rotate about a pivot point. The friction hinge engagement means can include a first portion that includes a computing device engagement means to couple to the computing device; and a second portion including a friction hinge engagement means to engage with the friction hinge upon receiving the computing device in the cradle.

Example 28 may include the subject matter of example 27, wherein the computing device engagement part includes a magnet, wherein the magnet is configured to cause a magnetic attraction between the magnet and the computing device, the magnetic attraction to cause the friction hinge engagement means to pivot about the second axis and causing the friction hinge engagement part to engage with the friction hinge.

Example 29 may include the subject matter of example 27, wherein computing device engagement means includes a tab, wherein the tab is configured to cause the friction hinge engagement means to pivot about the second axis and causing the friction hinge engagement part to engage with the friction hinge.

Example 30 may include the subject matter of example 29, wherein the second axis is substantially perpendicular to the first axis.

Example 31 may include the subject matter of any of examples 27 or 28 or 29 or 30, wherein the friction hinge includes a first mating gear and the friction hinge engagement part includes a second mating gear, the first mating gear configured to mate with the second mating gear.

Example 32 may include the subject matter of example 31, wherein the second mating gear is configured to move axially to engage the second mating gear.

Example 33 may include the subject matter of example 31, wherein the friction hinge engagement means is axially aligned with the friction hinge.

Example 34 may include the subject matter of any of examples 27 or 28 or 29 or 30 or 31 or 32 or 33, and also include a spring affixed to the second portion of the friction hinge engagement means and to the housing.

Example 35 may include the subject matter of any of examples 27 or 28 or 29 or 30 or 31 or 32 or 33 or 34, wherein the friction hinge includes a cog and the friction hinge engagement part includes a tooth configured to engage the cog.

Example 36 may include the subject matter of any of examples 27 or 28 or 29 or 30 or 31 or 32 or 33 or 34 or 35, wherein the friction hinge includes a torque hinge.

Example 37 may include the subject matter of any of examples 27 or 28 or 29 or 30 or 31 or 32 or 33 or 34 or 35 or 36, wherein the cradle includes an electrical connection to connect the computing device to the computer dock electronically.

Example 38 is a computer dock that includes a friction hinge. The computer dock includes a means for receiving a tablet into a cradle of the computer dock; a means for pivoting a lever arm about a pivot point; and a means for engaging the friction hinge upon pivoting of the lever arm.

Example 39 may include the subject matter of example 38, wherein the means for pivoting a lever arm about a pivot point includes a magnet affixed to a lever arm affixed to the pivot point.

Example 40 may include the subject matter of example 38, wherein means for pivoting a lever arm about a pivot point includes a tab located on a portion of a lever arm affixed to the pivot point.

Example 41 may include the subject matter of example 38 or 39 or 40, wherein the means for engaging the friction hinge includes a mating element affixed to a lever arm that can mate with a mating element coupled to the friction hinge.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A computer dock comprising:
   a housing coupled to the computer dock, the housing comprising a cradle to receive a computing device, the housing coupled to the computer dock by a hinge pin and configured to rotate about the hinge pin about a first axis;

a friction hinge rigidly affixed to the computer dock;
a pivot arm affixed to the housing, the pivot arm configured to rotate about a pivot point, the pivot arm comprising:
a first portion comprising a computing device engagement part to couple to the computing device; and
a second portion comprising a friction hinge engagement part to engage with the friction hinge upon receiving the computing device in the cradle.

2. The computer dock of claim 1, wherein the computing device engagement part comprises a magnet, wherein the magnet is configured to cause a magnetic attraction between the magnet and the computing device, the magnetic attraction to cause the pivot arm to pivot about the second axis and causing the friction hinge engagement part to engage with the friction hinge.

3. The computer dock of claim 1, wherein the computing device engagement part comprises a tab, wherein the tab is configured to cause the pivot arm to pivot about the second axis and causing the friction hinge engagement part to engage with the friction hinge.

4. The computer dock of claim 3, wherein the second axis is substantially perpendicular to the first axis.

5. The computer dock of claim 1, wherein the friction hinge comprises a first mating gear and the friction hinge engagement part comprises a second mating gear, the first mating gear configured to mate with the second mating gear, and wherein the second mating gear is configured to move axially to engage the second mating gear.

6. The computer dock of claim 5, wherein the pivot arm is axially aligned with the friction hinge.

7. The computer dock of claim 1, further comprising a spring affixed to the second portion of the pivot arm and to the housing.

8. The computer dock of claim 1, wherein the friction hinge comprises a cog and the friction hinge engagement part comprises a tooth configured to engage the cog.

9. The computer dock of claim 1, wherein the friction hinge comprises a torque hinge.

10. The computer dock of claim 1, wherein the cradle comprises an electrical connection to connect the computing device to the computer dock electronically.

11. A computing system comprising:
a computing device comprising a display; and
a computer dock comprising:
a housing coupled to the computer dock, the housing comprising a cradle to receive a computing device, the housing coupled to the computer dock by a hinge pin and configured to rotate about the hinge pin about a first axis;
a friction hinge rigidly affixed to the computer dock;
a pivot arm affixed to the housing, the pivot arm configured to rotate about a pivot point, the pivot arm comprising:
a first portion comprising a computing device engagement part to receive the computing device; and
a second portion comprising a friction hinge engagement part to engage with the friction hinge upon receiving the computing device in the cradle.

12. The computing system of claim 11, wherein the computing device engagement part comprises a magnet, wherein the magnet is configured to cause a magnetic attraction between the magnet and the computing device, the magnetic attraction to cause the pivot arm to pivot about the second axis and causing the friction hinge engagement part to engage with the friction hinge.

13. The computing system of claim 11, wherein the computing device engagement part comprises a tab, wherein the tab is configured to cause the pivot arm to pivot about the second axis and causing the friction hinge engagement part to engage with the friction hinge.

14. The computing system of claim 13, wherein the second axis is substantially perpendicular to the first axis.

15. The computing system of claim 11, wherein the friction hinge comprises a first mating gear and the friction hinge engagement part comprises a second mating gear, the first mating gear configured to mate with the second mating gear, and wherein the second mating gear is configured to move axially to engage the second mating gear.

16. The computing system of claim 15, wherein the pivot arm is axially aligned with the friction hinge.

17. The computing system of claim 11, further comprising a spring affixed to the second portion of the pivot arm and to the housing.

18. The computing system of claim 11, wherein the friction hinge comprises a cog and the friction hinge engagement part comprises a tooth configured to engage the cog.

19. The computing system of claim 11, wherein the friction hinge comprises a torque hinge.

20. The computing system of claim 11, wherein the cradle comprises an electrical connection to connect the computing device to the computer dock electronically.

21. A method for engaging a friction hinge of a computer dock, the method comprising:
receiving a tablet into a cradle of the computer dock;
pivoting a lever arm about a pivot point; and
engaging the friction hinge upon pivoting of the lever arm.

22. The method of claim 21, wherein receiving the tablet into the cradle comprises causing a magnetic attraction with a magnet affixed to the lever arm.

23. The method of claim 21, wherein receiving the tablet into the cradle comprises contacting a portion of the lever arm to cause the lever arm to pivot about a pivot point.

24. The method of claim 21, wherein engaging the friction hinge comprises engaging a mating element affixed to the friction hinge with the lever arm.

25. The method of claim 21, wherein engaging the friction hinge comprises engaging a mating element affixed to the friction hinge with a mating element coupled to the lever arm.

* * * * *